United States Patent [19]

Pinkston et al.

[11] 4,015,046
[45] Mar. 29, 1977

[54] PRINTING BLANKET AND METHOD OF MAKING SAME

[75] Inventors: Melvin D. Pinkston, Waynesville; Robert L. Hartenstein, Canton, both of N.C.

[73] Assignee: Dayco Corporation, Dayton, Ohio

[22] Filed: Feb. 23, 1976

[21] Appl. No.: 660,750

[52] U.S. Cl. ............................. 428/422; 156/333; 428/520; 428/522; 428/909

[51] Int. Cl.² ................ B41N 9/00; B32B 31/04; B32B 27/00

[58] Field of Search ......... 428/909, 421, 422, 520, 428/522; 156/333

[56] References Cited

UNITED STATES PATENTS

| | | | |
|---|---|---|---|
| 2,112,544 | 3/1938 | Rice | 428/909 X |
| 2,489,791 | 11/1949 | Liles et al. | 428/909 X |
| 2,809,130 | 10/1957 | Rappaport | 428/422 X |
| 3,164,087 | 1/1965 | Owen | 428/909 X |
| 3,819,471 | 6/1974 | Sohnemann | 428/909 X |
| 3,917,895 | 11/1975 | Bosniack | 428/421 |
| 3,967,042 | 6/1976 | Laskin et al. | 428/422 |
| 3,983,287 | 9/1976 | Goossen et al. | 428/909 X |

Primary Examiner—Harold Ansher
Attorney, Agent, or Firm—Reuben Wolk

[57] ABSTRACT

A printing blanket and method of making same is provided wherein such blanket comprises a base structure, a surface layer made of a fluorocarbon elastomer, and a binder layer comprised of a polychloroprene elastomer which provides optimum adhesion between the base structure and the surface layer.

19 Claims, 3 Drawing Figures

PRINTING BLANKET AND METHOD OF MAKING SAME

BACKGROUND OF THE INVENTION

Printing blankets are in wide use in offset lithographic printing and as is well known in the art, such blankets are used to transfer ink from a printing plate to a material, such as paper, being printed. The usual printing blanket in most common use has a surface layer made of either natural or synthetic rubber; however, the surface layer of such a blanket often lacks the necessary chemical resistance for use with the more newly developed inks and with solutions used to clean the blanket during ordinary use whereby such a surface layer and blanket is often damaged by ink and/or cleaning solution.

In an effort to arrive at a printing blanket in which the surface layer can withstand a variety of operating conditions and is capable of operating with various inks and cleaning solutions without damage thereto, various materials have been proposed for the surface layer, including polytetrafluoroethylene, and as disclosed in U.S. Pat. No. 3,164,087. However, a serious problem in using a fluorocarbon in a printing blanket is that it is difficult to adhere the fluorocarbon to an associated substrate layer.

SUMMARY

It is a feature of this invention to provide an economical and simple printing blanket and method of making same which has a surface layer which may be used with a wide variety of inks and cleaning solutions.

Another feature of this invention is to provide an improved printing blanket and method of making same wherein such printing blanket comprises a surface layer made of a fluorocarbon elastomer which is tenaciously bonded to an adjoining layer.

Another feature of this invention is the provision of a printing blanket of the character mentioned having a base structure and an improved binder layer between the base structure and fluorocarbon surface layer with the binder layer being a polychloroprene elastomer having means therein providing optimum adhesion between the base structure and the surface layer of fluorocarbon elastomer.

Accordingly, it is an object of this invention to provide an improved printing blanket and method of making same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
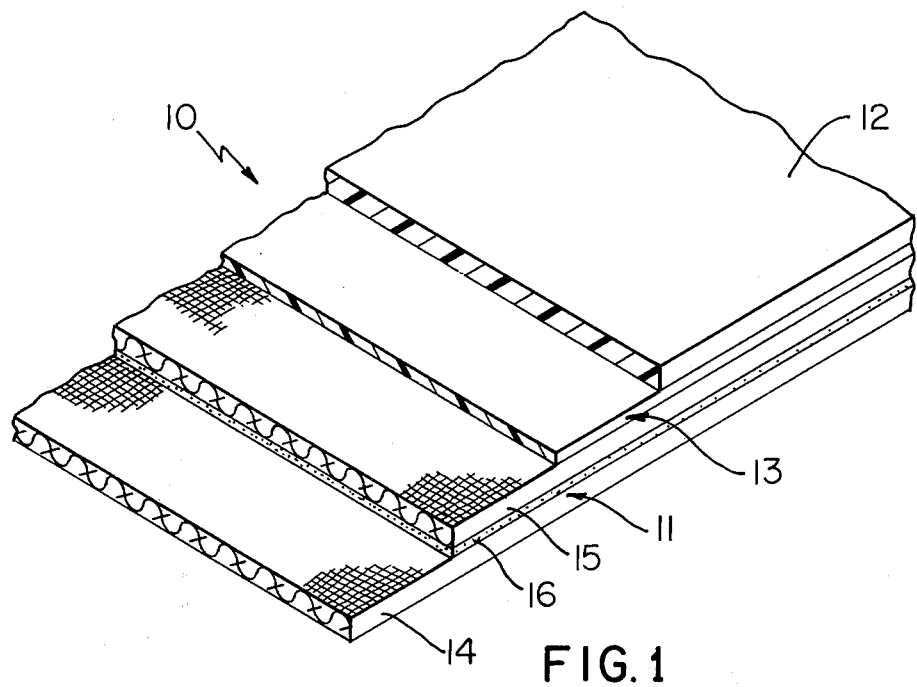
FIG. 1 is a perspective view with parts in cross section, parts in elevation, and parts broken away illustrating one exemplary embodiment of the printing blanket of this invention and method of making same.

Reference is now made to FIG. 1 of the drawing which illustrates one exemplary embodiment of the printing blanket and method of making same of this invention which is designated generally by the reference numeral 10; and, the printing blanket 10 is comprised of a base structure which is designated generally by the reference numeral 11, a surface layer 12 made of a fluorocarbon elastomer, and a binder layer 13 made of a polychloroprene elastomer having means therein providing optimum adhesion between the base structure 11 and the surface layer 12 of fluorocarbon elastomer.

The base structure 11 of the blanket 10 of this example is comprised of a plurality of two fabric layers 14 and 15 which are suitably bonded together by an adhesive layer 16 which may be in the form of a neoprene cement or other suitable adhesive material. The fabric layers 14 and 15 may be made of any suitable material known in the art including cotton, rayon, glass, and similar materials.

The surface layer 12 is made of a fluorocarbon elastomer and it has been found that a fluorocarbon elastomer is capable of being used with a wide variety of inks and a wide variety of cleaning solutions as used in the offset printing industry. Various type of fluorocarbon elastomers which may be employed will now be discussed in detail.

One example of a fluorocarbon elastomer which may be used for the surface layer 12 is in the form of a copolymer of hexafluoropropylene and vinylidene fluoride and is sold by Chemical Division, Minnesota Mining and Manufacturing Co., 3 M Center, St. Paul, Minnesota 55101, under the trade name of FLUOREL. Another example of a fluorocarbon elastomer which may be used for the surface layer 12 and also made by the above-named company is in the form of a high molecular weight copolymer of chlorotrifluoroethylene and vinylidene fluoride, and is sold under the trade name of KEL-F. Another example of a fluorocarbon elastomer which may be used for the surface layer 12 is in the form of an elastomer which has a fluorine content of more than 63% and is manufactured by Montecatini Edison, S.p.A., Largo G. Donegani ½, 20121 Milani, Italy, and is sold under the trade name of TECNOFLON.

Another example of a fluorocarbon elastomer which may be used for the surface layer 12 is considered a fluorinated rubber and sold by Daikin Kogyo Co., Ltd., 8 Umeda, Kita-ku, Osaka, Japan, under the trade name of DAI-EL.

Another example of a fluorocarbon elastomer which may be used for the surface layer 12 is sold by the Elastomer Chemicals Department, E. I. du Pont de Nemours & Co., Wilmington, Delaware 19898 and sold under the registered trademark of VITON. Preferably a fluorocarbon elastomer known as VITON B is employed and in one application of this invention VITON B was compounded in accordance with the following Table I and provided a superior surface layer 12.

TABLE I

| Constituent | Parts By Weight |
| --- | --- |
| VITON B, Fluorocarbon elastomer | 100 |
| Magnesium Oxide | 15 |
| Thermal Black | 5 |

TABLE I-continued

| Constituent | Parts By Weight |
|---|---|
| Polyfunctional Amine | 2.5 |

The surface layer 12 with Thermal Black had a black appearance when made in accordance with the above table; however, it will be appreciated that titanium dioxide or other non-black filler may be employed instead of thermal black (or carbon black) to provide a surface layer 12 having a lighter appearance.

The polychloroprene binder layer 13 is unique in assuring that it provides optimum adhesion between the base structure 11 and the surface layer 12. The polychloroprene binder layer 13 is comprised primarily of polychloroprene, a suitable binder in the form of an epoxy resin, and a hydrated silica. The binder serves as an exciter and the silica serves as a vehicle in the binder layer whereby a tenacious bond is provided between the base structure layer 11 and the fluorocarbon elastomer in the surface layer 12. It has been found that excellent results may be obtained when utilizing a compound having 100 parts of polychloroprene, 5 to 20 parts of a resin binder in the form of an epoxy resin, and 30 to 50 parts of hydrated silica. It will be appreciated, however, that the polychloroprene binder layer 13 will usually have other constituents and the following Table II presents typical constituents of a binder layer 13 and amounts of such constituents.

TABLE II

| Constituent | Parts by Weight |
|---|---|
| Polychloroprene | 100 |
| Calcium Stearate | 4 |
| Magnesium Oxide | 4 |
| N-phenyl-alpha-naphthalamine | 2 |
| Epoxy Resin | 5 |
| Hydrated Silica | 40 |
| Polyethylene Tackifer | 4 |
| Zinc Oxide | 5 |
| Calcium Oxide | 10 |
| Trimethyl-thiourea accelerator | 2 |

Figure 2:
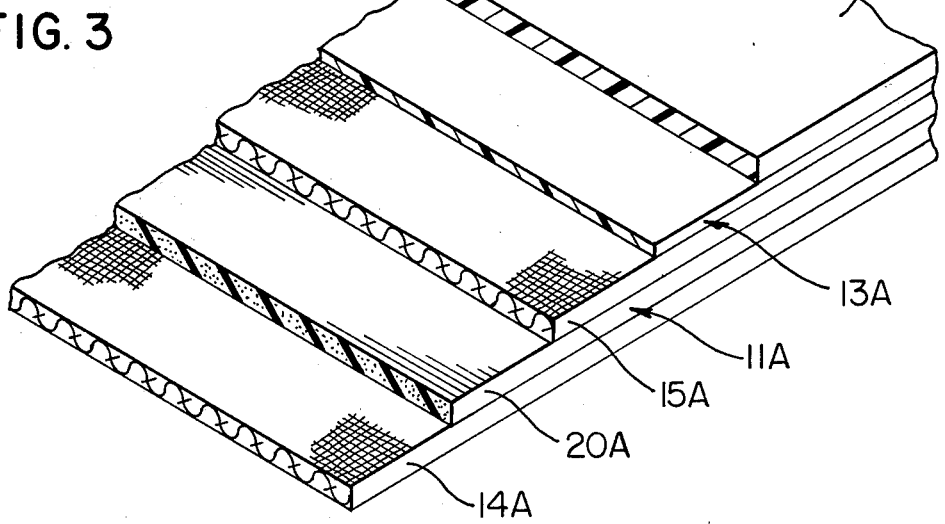
FIG. 2 is a view similar to FIG. 1 illustrating another exemplary embodiment of the printing blanket of this invention.

Another exemplary embodiment of the printing blanket and method of making same of this invention is illustrated in FIG. 2 of the drawing. The printing blanket and method of FIG. 2 is very similar to the blanket and method 10, therefore such blanket and method will be designated in the drawing by the same reference numeral 10 followed by the letter designation A and the base structure, binding layer, and surface layer will have the same reference numerals as in the blanket 10 followed by the reference letter A and thus will be designated 11A, 13A, and 12A respectively.

The main difference between the printing blanket 10A and the printing blanket 10 is that the printing blanket 10A has a compressible layer 20A between the fabric layers of its base structure and such fabric layers are designated 14A and 15A. The compressible layer 20A may be made utilizing any suitable material and technique known in the art and one example of a compressible layer which may be employed is illustrated in U.S. Pat. No. 3,795,568. For example, such compressible layer may be comprised of an elastomeric matrix material having a closed-cell cellular structure formed of unconnected voids uniformly distributed throughout said matrix.

Figure 3:
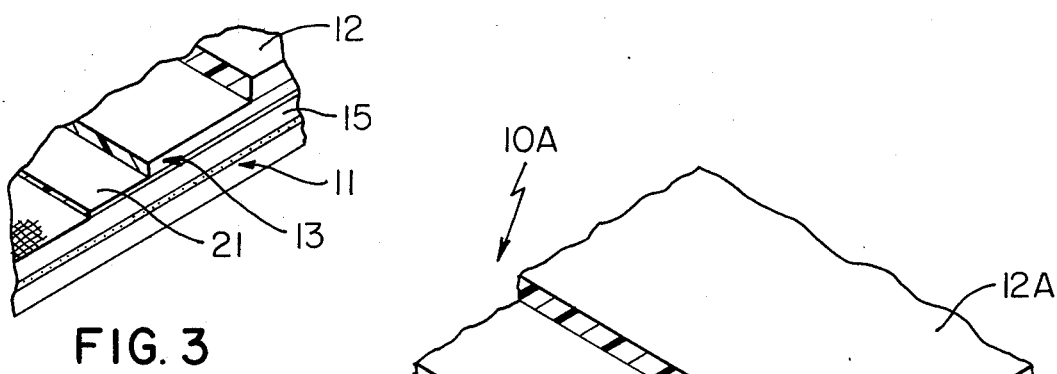
FIG. 3 is a fragmentary view illustrating a protective layer between the base structure and binder layer of the blanket of FIG. 1.

In the normal application of printing blankets, it has been found that there is considerable wicking action through the base structure to the other layers disposed thereabove. The wicking action results in fluid or liquid being introduced against the binder layer and often such fluid serves to attack the binder layer either 13 or 13A. To highlight that in many applications of this invention it is desirable to provide a barrier between the base structure and the polychloroprene binder layer, it is desirable in many applications to employ an acrylonitrile layer together with any suitable adhesive promoter which will promote adhesion of the acrylonitrile layer to the base structure and to the polychloroprene binder layer. For example, as illustrated in FIG. 3 of the drawing, an acrylonitrile layer 21 is shown between the base structure 11 and in particular the top layer 15 of the base structure and the binder layer 13. The acrylonitrile layer may be of any suitable thickness and is preferably of the order of several thousandths of an inch which may range between 0.001 inch and 0.004 inch, for example.

It will also be appreciated that an acrylonitrile layer may be provided between the top layer 15A of the base structure 11A and the polychloroprene binder layer 13A, if desired.

The base structure 11 and 11A of each of the blankets 10 and 10A respectively may be of any suitable thickness known in the art; however, and as an example the layers 14 and 15 of the blanket 10 may each be 0.015 inch thick. Similarly, the base structure 11A of the blanket 10A may have layers 14A and 15A each 0.015 inch thick with the compressible layer 20A being generally of the order 0.010 inch thick.

The uppermost two layers comprised of the surface layer and the binder layer in each of the blankets 10 and 10A may vary in thickness and may range between 0.001 inch and 0.040 inch.

In a typical blanket of this invention which uses an acrylonitrile barrier layer the uppermost two layers may have an overall thickness of 0.020 inch with the fluorocarbon surface layer having a thickness of 0.010 inch, the polychloroprene layer having a thickness of 0.006 inch, and the acrylonitrile layer having a thickness of 0.004 inch. However, it is to be understood that these various layers may have any suitable thickness and may vary in any desired combination so that the overall combined thickness of the layers with or without the acrylonitrile layer may range between 0.001 inch and 0.040 inch as previously mentioned.

The manner in which the polychloroprene binder layer 13 and top surface layer 12 of blanket 10, for example, may be built up may vary in accordance with any technique known in the art. Preferably each of these layers is built up by spreading successive comparatively thin layers of material on an adjoining structure until the desired thickness is obtained for the layer being built up.

The binder layer 13 is presented in Table II above as having 100 parts by weight of polychloroprene in addition to other constituents; however, it may be desirable in some applications to blend a compatible polymer with the polychloroprene to enhance the properties of the polychloroprene and define what will be referred to as a polymeric blend. Examples of compatible polymers which may be employed are chlorinated polyethylene, acrylonitrile, polysulfide, and chlorosulfonated polyethylene. These polymers may be blended to define the above-mentioned polymeric blend comprised of 50 to 99 parts by weight of polychloroprene with the balance of the polymeric blend being one of the above-mentioned compatible polymers.

For simplicity of blending the polymeric blend may also be comprised of roughly 50 parts by weight of polychloroprene and roughly 50 parts by weight of one of the above-mentioned polymers. Nevertheless, as long as at least 50 parts by weight of polychloroprene are used, the binder layer 13 is assured of providing a tenacious bond between the base structure 11 and the surface layer 12.

From the above, it is seen that this invention provides an improved printing blanket having a surface layer made of a fluorocarbon elastomer which provides optimum performance for offset printing blankets yet such fluorocarbon surface layer is tenaciously bonded to a base structure in an improved manner which assures a prolonged service life for the associated blanket.

While present exemplary embodiments of this invention and methods of practicing the same have been illustrated and described, it will be recognized that this invention may be otherwise variously embodied and practiced within the scope of the following claims.

What is claimed is:

1. A printing blanket comprising a base structure, a surface layer made of a fluorocarbon elastomer, and a binder layer; said binder layer being comprised of 100 parts of polychloroprene elastomer, 5 to 20 parts of a resin binder, and 30 to 50 parts of a hydrated silica, said binder serving as an exciter and said hydrated silica serving as a vehicle in said binder layer, said binder layer providing a tenacious bond and optimum adhesion between said surface layer and said base structure.

2. A printing blanket as set forth in claim 1 in which said base structure comprises a fabric layer.

3. A printing blanket as set forth in claim 1 in which said base structure comprises a plurality of fabric layers.

4. A printing blanket as set forth in claim 1 in which said base structure comprises at least one fabric layer and a compressible layer.

5. A printing blanket as set forth in claim 1 in which said resin binder is an epoxy resin.

6. A printing blanket as set forth in claim 1 in which said fluorocarbon elastomer is a compound including magnesium oxide, thermal black, and a polyfunctional amine.

7. A printing blanket as set forth in claim 1 in which said fluorocarbon elastomer is a compound including magnesium oxide, titanium dioxide, and polyfunctional amine.

8. A printing blanket as set forth in claim 1 in which said fluorocarbon elastomer is a copolymer of hexafluoropropylene and vinylidene fluoride.

9. A printing blanket as set forth in claim 1 in which said fluorocarbon elastomer is a copolymer of chlorotrifluoroethylene and vinylidene fluoride.

10. A printing blanket as set forth in claim 1 in which said fluorocarbon elastomer has more than 63% fluorine.

11. A printing blanket as set forth in claim 1 in which said binder layer comprises; a polymeric blend comprised of roughly 50 parts by weight of polychloroprene and roughly 50 parts by weight of a polymer from the group consisting of chlorinated polyethylene, acrylonitrile, polysulfide, and chlorosulfonated polyethylene; 5 to 20 parts of a resin binder; and 30 to 50 parts of a hydrated silica; said resin binder serving as an exciter and said hydrated silica serving as a vehicle which provides a tenacious bond between said fluorocarbon elastomer and said base structure.

12. A printing blanket as set forth in claim 1 and further comprising an acrylonitrile layer between the base structure and the polychloroprene layer, said acrylonitrile layer serving as a barrier preventing said binder layer from being attacked by fluids permeating through said base structure.

13. A printing blanket as set forth in claim 12 in which said acrylonitrile layer has a thickness generally of the order of several thousandths of an inch.

14. A printing blanket as set forth in claim 12 in which said binder and surface layers have a total thickness ranging between 0.001 inch and 0.040 inch.

15. A printing blanket as set forth in claim 12 in which said surface layer has a thickness of approximately one-half the combined thickness of said binder and surface layers.

16. A printing blanket as set forth in claim 1 in which said binder layer comprises; a polymeric blend comprised of 50 to 99 parts by weight of polychloroprene with the balance of said polymeric blend being a polymer from the group consisting of chlorinated polyethylene, acrylonitrile, polysulfide, and chlorosulfonated polyethylene, 5 to 20 parts of a resin binder; and 30 to 50 parts of a hydrated silica; said resin binder serving as an exciter and said hydrated silica serving as a vehicle which provides a tenacious bond between said fluorocarbon elastomer and said base structure.

17. A printing blanket as set forth in claim 16 in which said fluorocarbon elastomer is a compound including magnesium oxide, carbon black, and a polyfunctional amine.

18. A printing blanket as set forth in claim 16 in which said fluorocarbon elastomer is a compound including magnesium oxide, a non-black filler, and a polyfunctional amine.

19. A method of making a printing blanket comprising the steps of forming a base structure, applying on said base structure a binder layer comprised of a polychloroprene elastomer having adhesion promoters therein, said binder layer being compounded from materials comprising at least 50 parts by weight of polychloroprene elastomer, 5 to 20 parts by weight of resin binder, and 30 to 50 parts by weight of hydrated silica, and disposing a surface layer made of a fluorocarbon elastomer on said binder layer by building up consecutive thin layers until a desired thickness for said surface layer is attained.

* * * * *